United States Patent [19]

Kobayashi et al.

[11] Patent Number: 4,895,903

[45] Date of Patent: Jan. 23, 1990

[54] THERMOPLASTIC ELASTOMER COMPOSITIONS

[75] Inventors: Seizo Kobayashi; Katumi Usui; Takashi Mizoe, all of Yokohama, Japan

[73] Assignee: Nippon Oil Company, Limited, Japan

[21] Appl. No.: 185,109

[22] Filed: Apr. 22, 1988

[30] Foreign Application Priority Data

Apr. 24, 1987 [JP] Japan .................................. 62-99952

[51] Int. Cl.$^4$ ...................... C08L 23/16; C08L 23/18; C08L 23/12; C08L 23/26
[52] U.S. Cl. .................................... 525/133; 525/240; 525/194; 525/195
[58] Field of Search ......................... 525/240, 194, 133

[56] References Cited

U.S. PATENT DOCUMENTS

| 4,311,628 | 1/1982 | Sabet et al. | 525/133 |
| 4,732,940 | 3/1988 | Yamaoka et al. | 525/194 |
| 4,748,206 | 5/1988 | Nogiwa et al. | 525/240 |

FOREIGN PATENT DOCUMENTS 0164217 12/1985 European Pat. Off. .

*Primary Examiner*—Carman J. Seccuro
*Attorney, Agent, or Firm*—Scully, Scott, Murphy & Presser

[57] ABSTRACT

A thermoplastic elastomer composition prepared by crosslinking a composition comprising the following components (A), (B) and (C) by using a phenolic curing agent:

(A) 30-70 parts by weight of an ethylene/α-olefin copolymer prepared by copolymerizing ethylene and an α-olefin having 3 to 12 carbon atoms in the presence of a catalyst comprising a solid component and an organoaluminum compound which solid component contains at least magnesium and titanium, said ethylene/α-olefin copolymer having the following properties (I) to (IV):

| (I) | Melt index | 0.01–100 g/10 min |
| (II) | Density | 0.860–0.910 g/cm$^3$ |
| (III) | Maximum peak temperature as measured according to a differential scanning calorimetry (DSC) | not lower than 100° C. |
| (IV) | Insolubles in boiling n-hexane | not less than 10 wt. % |

(B) 70–30 parts by weight of a propylene polymer; and
(C) 70–150 parts by weight, based on 100 parts by weight of the components (A) and (B), of an ethylene/α-olefin/non-conjugated diene copolymer rubber.

8 Claims, No Drawings

THERMOPLASTIC ELASTOMER COMPOSITIONS

BACKGROUND OF THE INVENTION

The present invention relates to a thermoplastic elastomer composition and more particularly to a thermoplastic elastomer composition superior in fluidity, permanent set and external appearance of molded articles obtained therefrom.

As thermoplastic polyolefin elastomers there are known compositions comprising crystalline polyolefins such as polyethylene and polypropylene as hard segments and amorphous copolymer rubbers such as ethylene/propylene copolymer rubber (EPR) and ethylene/propylene/non-conjugated diene copolymer rubber (EPDM) as soft segments, as well as compositions obtained by partially crosslinking the above compositions. It is also known to prepare hard and soft segments according to a multi-stage polymerization process, And by changing the proportions of those segments there are obtained various grades of products ranging from one superior in flexibility up to one having rigidity.

Products of the flexible grade are attracting great attention because they can be applied as rubbery materials widely to such uses as automobile parts, hoses, electric wire coating and packing. In preparing such flexible grade of products it is necessary to increase the proportion of a soft segment (e.g. EPR or EPDM) and decrease that of a hard segment (e.g. polyethylene or polypropylene) in order to impart rubbery flexibility thereto.

However, such soft segments as EPR and EPDM are poor in tensile strength and inferior in resistance to heat and oil and also inferior in fluidity. Consequently, flexible, thermoplastic elastomer compositions containing large amounts of such soft segments also have the above-mentioned drawback and cannot be applied to a wide variety of uses. Increasing the hard segment proportion to remedy these problems will result in loss of flexibility, deterioration of physical properties such as permanent set and consequent impairment of the function as a flexible, thermoplastic elastomer.

More, in preparing a product of the flexible grade, it is necessary to carry out polymerizations separately for hard and soft segments, thus resulting in that not only the polymerization apparatus becomes very complicated in structure but also it is very difficult to control the properties and proportion of each segment in each polymerization stage and a defective product sometimes occurs at the time of changeover from one to another grade. Further, the recover of the resulting polymer is also very difficult because a large amount of a rubbery component is contained therein.

The present inventors proposed a novel thermoplastic elastomer composition (U.S. Ser. No. 081,464 filed 8/4/87, now U.S. Pat. No. 4,822,855; European Patent Application No. 87306788.8) to remedy the above problems. It is, however, not so greatly improved in permanent set and flexibility.

SUMMARY OF THE INVENTION

It is an object of the present invention is to overcome the above mentioned problems.

It is another object of the present invention is to provide a thermoplastic elastomer composition superior to fluidity, permanent set, external appearance of molded articles obtained therefrom, flexibility and heat resistance and of which various physical properties are well-balanced.

The present invention relates in a thermoplastic elastomer composition obtained by crosslinking a composition comprising the following components (A), (B) and (C) using a phenolic curing agent:

(A) 30–70 parts by weight of an ethylene/$\alpha$-olefin copolymer prepared by copolymerizing ethylene and an $\alpha$-olefin having 3 to 12 carbon atoms in the presence of a catalyst comprising a solid component and an organoaluminum compound which solid component contains at least magnesium and titanium, said ethylene/$\alpha$-olefin copolymer having the following properties (I) to (IV):

| | |
|---|---|
| (I) Melt index | 0.01–100 g/10 min |
| (II) Density | 0.860–0.910 g/cm$^3$ |
| (III) Maximum peak temperature as measured according to a differential scanning calorimetry (DSC) | not lower than 100° C. |
| (IV) Insolubles in boiling n-hexane | not less than 10 wt. % |

(B) 70–30 parts by weight of a propylene polymer, and (C) 70–150 parts by weight [based on 100 parts by weight of the components (A) and (B)] of an ethylene/$\alpha$-olefin/non-conjugated diene copolymer rubber.

DETAILED DESCRIPTION OF THE PREFERRED EMBODIMENTS (1) Ethylene/$\alpha$-Olefin Copolymer (A)

In the ethylene/$\alpha$-olefin copolymer (A) used in the present invention, the $\alpha$-olefin to be copolymerized with ethylene is one having 3 to 12 carbon atoms. Examples are propylene, butene-1, 4-methylpentene-1, hexene-1, octene-1, decene-1 and dodecene-1. Particularly preferred are propylene, butene-1, 4-methylpentene-1 and hexene-1 which have 3 to 6 carbon atoms. It is preferable that the $\alpha$-olefin content in the ethylene/$\alpha$-olefin copolymer be in the range to 5 to 40 mol %.

The following description is provided about how to prepare the ethylene/$\alpha$-olefin copolymer (A) used in the present invention.

The catalyst system used comprises a solid component and an organoaluminum compound, the solid component containing at least magnesium and titanium. For example, the solid component is obtained by supporting a titanium compound on an inorganic solid compound containing magnesium by a known method. Examples of magnesium-containing inorganic solid compounds include, in addition to metal magnesium, magnesium hydroxide, magnesium carbonate, magnesium oxide, magnesium chloride, as well as double salts, double oxides, carbonates, chlorides and hydroxides, which contain magnesium atom and a metal selected from silicon, aluminum and calcium further, these inorganic solid compounds after treatment or reaction with oxygen-containing compounds, sulfur-containing compounds, aromatic hydrocarbons or halogen-containing substances.

As examples of the above oxygen-containing compounds are mentioned water and organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thio-ethers and the like, and inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formual $Ti(OR)_n X_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, trimethoxymonochlorititanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitatium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides such as titanium tetrachloride and titanium tetrabromide reduced with hydrogen, aluminum, titanium or an organometallic compound of a Group I-III metal in the Periodic Table, as well as trivalent titanium compounds obtained by reducing tetravalent alkoxytitanium halides of the general formula $Ti(OR)_m X_{4-m}$ with an organometallic compound of a Group I-III metal in the Periodic Table in which formula R is an alkyl, aryl or aralkyl group having 1 to 20 carbon atoms, X is a halogen atom and m is $0<m<4$. Tetravalent titanium compounds are particularly preferred.

As preferred examples of catalyst systems are mentioned combinations of organoaluminum compounds with such solid components as $MgO-RX-TiCl_4$ (Japanese Patent Publication No. 3514-1976), $Mg-SiCl_4-ROH-TiCl_4$ (Japanese Patent Publication No. 23864/1975), $MgCl_2-Al(OR)_3-TiCl_4$ (Japanese Patent Publication Nos. 152/1976 and 15111/1977), $MgCl_2-SiCl_4-ROH-TiCl_4$ (Japanese Patent Laid Open No. 106581/1974), $Mg(OOCR)_2-Al(OR)_3-TiCl_4$ (Japanese Patent Publication No. 11710/1977, $Mg-POCl_3-TiCl_4$ (Japanese Patent Publication No. 153/1976), $MgCl_2-AlOCl-TiCl_4$ (Japanese Patent Publication No. 15316/1979) and $MgCl_2-Al(OR)_c X_{3-n}-Si(OR')_m X_{4-m}-TiCl_4$ (Japanese Patent Laid Open No. 95909/1981), in which formulae R and R' are each an organic radical and X is a halogen atom.

As other examples of catalyst systems are mentioned combinations of organoaluminum compounds with reaction products as solid components obtained by the reaction of organomagnesium compounds such as so-called Grignard compounds with titanium compounds.

Examples of organomagnesium compounds are those of the general formulae $RMgX$, $R_2Mg$ and $RMg(OR)$ wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

More concrete examples of such catalyst systems are combinations of organoaluminum compounds with such solid components as $RMgX-TiCl_4$ (Japanese Patent Publication No. 39470/1975), $RMgX-phenol-TiCl_4$ (Japanese Patent Publication No. 12953/1979), $RMgX-halogenated\ phenol-TiCl_4$ (Japanese Patent Publication No. 12954/1979) and $RMgX-CO_2-TiCl_4$ (Japanese Patent Laid Open No. 73009/1982).

As still other examples of catalyst systems are mentioned combinations of organoaluminum compounds with solid products obtained by contacting such inorganic oxides as $SiO_2$ and $Al_2O_3$ with the solid component containing at least magnesium and titanium. In addition to $SiO_2$ and $Al_2O_3$ there also may be mentioned $CaO$, $B_2O_3$ and $SnO_2$ as examples of inorganic oxides. Double oxides thereof are also employable without any trouble. For contacting these inorganic oxides with the solid component containing magnesium and titanium, there may be adopted a known method. For example, both may be reacted at a temperature of 20° to 400° C., preferably 50° to 300° C., usually for 5 minutes to 20 hours, in the presence or absence of an inert solvent, or both may be subjected to a co-pulverization treatment, or there may be adopted a suitable combination of these methods.

As more concrete examples of such catalyst systems, mention may be made of combination of organoaluminum compounds with $SiO_2-ROH-MgCl_2-TiCl_4$ (Japanese Patent Laid Open No. 47407/1981), $SiO_2-R-O-R'-MgO-AlCl_3-TiCl_4$ (Japanese Patent Laid Open No. 187305/1982) and $SiO_2-MgCl_2-Al(OR)_3-TiCl_4-Si(OR')_4$ (Japanese Patent Laid Open No. 21405/1983) in which formulae R and R' are each a hydrocarbon radical.

In these catalyst systems the titanium compounds may be used as adducts with organocarboxylic acid esters, and the magnesium-containing inorganic solid compounds may be used after contact treatment with organic carboxylic acid esters. Moreover, the organoaluminum compounds may be used as adducts with organocarboxylic acid esters. Further, the catalyst systems may be prepared in the presence of organic carboxylic acid esters.

As organic carboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl of benzoic, anisic and toluic acids.

As preferred examples of the organoaluminum compound to be combined with the solid component are mentioned those represented by the general formulae $R_3Al$, $R_2AlX$, $RAlX_2$, $R_2AlOR$, $RAl(OR)X$ and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The catalyst system exemplified above may be contacted with an α-olefin before it is used in the polymerization reaction. By so doing, a stabler operation is ensured as compared with the case where it is not so treated.

The polymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° to 300° C., preferably 40° to 200° C., and pressure in the range from normal pressure to 70 kg/cm$^2$.G, preferably 2 kg/cm$^2$.G or 60 kg/cm$^2$.G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

The melt flow rate MFR, according to JIS K 7210, test condition No. 4 (190° C., 2.16 kgf) of the ethylene/α-olefin copolymer (A) thus prepared is in the range of 0.01 to 100 g/10 min, preferably 0.1 to 50 g/10 min. Its density (according to JIS K 7112) is in the range of 0.860 to 0.910 g/cm$^3$, preferably 0.870 to 0.905 g/cm$^3$ and more preferably 0.870 to 0.900 g/cm$^3$. Its maximum peak temperature (Tm) measured according to a differential scanning calorimetry (DSC) is not lower than 100° C., preferably not lower than 110° C. Its insolubles in boiling n-hexane are not less than 10 wt. %, preferably 20-95 wt. % and more preferably 20-90 wt. %.

If MFR of the ethylene/α-olefin copolymer (A) is less than 0.01 g/10 min, MFR of the thermoplastic elastomer composition will become too low, resulting in deterioration of its fluidity. And if it exceeds 100 g/10 min, the tensile strength will be reduced. A density thereof lower than 0.860 g/cm$^3$ would result in lowering of tensile strength, surface stickiness of the composition and impairment of the appearance. A density of the copolymer exceeding 0.910 g/cm$^3$ is not desirable, because it would cause deterioration of flexibility and transparency. A maximum peak temperature thereof as measured according to DSC of lower than 100° C. is not desirable, either, because it would result in lowering of tensile strength, surface stickiness of the composition and reduced resistance to heat. If the proportion of insolubles in boiling n-hexane is smaller than 10 wt. %, the resulting composition will be reduced in tensile strength and become sticky on its surface, and thus such a proportion is undesirable.

(2) Propylene Polymer (B)

As examples of the propylene polymer (B) used in the present invention there are mentioned not only a homopolymer of propylene but also block and random copolymers of propylene and other comonomers. Preferred as the comonomers are α-olefins having 2 to 8 carbon atoms such as, for example, ethylene, butane-1, hexene-1, 4-methylpentene-1, and octene-1. Preferably, these comonomers are present in proportions not larger than 30 mol % in the copolymers.

The melt flow rate (MFR, according to JIS K 7210, test condition No. 14) of the propylene polymer may be in the range of 0.1 to 100 g/10 min, preferably 0.1 to 50 g/10 min, more preferably 0.5 to 20 g/10 min. If MFR is smaller than 0.1 g/10 min, it will be impossible to obtain a resin composition having good fluidity, and if MFR exceeds 100 g/10 min, it will result in reduced tensile strength and impact strength.

(3) Ethylene/α-Olefin/Non-Conjugated Diene Copolymer Rubber (C)

In the ethylene/α-olefin/non-conjugated diene copolymer rubber (C), examples of the α-olefin are propylene, butene-1, pentene-1, 4-methylpentene-1, hexene-1 and octene-1, with propylene being particularly preferred.

Examples of the non-conjugated diene are 1,4-hexadiene, 1,6-octadiene, dicyclopentadiene, vinyl norbornene and ethylidene norbornene, with 1,4-hexadiene and ethylidene norbornene being preferred.

The ethylene/α-olefin/non-conjugated diene copolymer rubber used in the invention has a Mooney viscosity (ML$_{1+4}$, 100° C.) of 10 to 95. A Mooney viscosity thereof lower than 10 is not desirable because it would result in reduced tensile strength or sticky surface of the thermoplastic elastomer composition. A Mooney viscosity of the copolymer rubber exceeding 95 is also undesirable because it will lead to deterioration in the flow property of the thermoplastic elastomer composition.

The iodine value (the degree of unsaturation) of the ethylene/α-olefin/non-conjugated diene copolymer is preferably in the range of 5 to 30. If the iodine value is smaller than 5, it would cause reduction of physical properties of the thermoplastic elastomer composition. If it exceeds 30, it would cause reduction of resistance to heat aging property.

(4) Composition Ratio (Mixing Ratio)

The composition ratios of the ethylene/α-olefin copolymer (A) [hereinafter referred to as component (A)], the propylene polymer (B) [hereinafter referred to as component (B)] and the ethylene/α-olefin/non-conjugated diene copolymer rubber (C) [hereinafter referred to as component (C)] in the thermoplastic elastomer composition of the present invention are 30–70 parts, preferably 40–60 parts, by weight of component (A), 70–30 parts, preferably 60–40 parts, by weight of component (B), and 70–150 parts, preferably 80–120 parts, by weight based on 100 parts by weight of components (A) and (B), of component (C).

If the proportion of component (A) exceeds 70 parts by weight, the heat resistance and fluidity will be reduced, and if it is smaller than 30 parts by weight, the flexibility and permanent elongation will be reduced. If the proportion of component (B) exceeding 70% by weight, the flexibility and permanent elongation will be reduced, and if it is smaller than 30 parts by weight, the heat resistance and fluidity will be reduced.

Further, if the proportion of component (C) is smaller than 70 parts by weight based on 100 parts by weight of components (A) and (B), the flexibility and permanent elongation will be exceeds 150 parts by weight, reduced, and if it the heat resistance strength will be reduced.

(5) Preparation of the Thermoplastic Elastomer Composition

For preparing the thermoplastic elastomer composition of the present invention, the components (A), (B) and (C) may be mixed together in predetermined proportions followed by crosslinking by using a phenolic curing agent.

The mixing and crosslinking may be effected by any known method. A typical example is a mechanical melt-kneading method which is carried out under the addition of a phenolic curing agent to the above mixture. According to this known method, the crosslinking can be effected using any of uni- and biaxial extruders, Bambury's mixer, various kneaders and rolls. The melt-kneading temperature is usually in the range of 100° to 250° C.

As the phenomic curing agent there may be used resol type phenolic resins which have been conventionally used for curing rubbers such as butyl rubber. As preferred examples are mentioned oligomers (e.g. dimer, trimer, tetramer) of alkyl methylol phenols such as tertiary butyl methylol phenol, $\alpha,\alpha,\gamma,\gamma$-tetramethylbutyl methylol phenol, dodecyl methylol phenol, eicosyl methylol phenol and the like. The crosslinking may be performed more efficiently by using a crosslinking accelerator together with the phenolic curing agent. Preferred example of the crosslinking accelerator are metal oxides such as zinc oxide, titanium oxide and magnesium oxide, metal chlorides such as stannous chloride and ferric chloride.

The amount of the phenolic curing agent used differs according to the performance required for the thermoplastic elastomer composition, but is usually in the range of 0.5 to 10 parts by weight, preferably 1 to 5 parts by weight.

If a conventional organic peroxide is used instead of the phenolic curing agent. The objects of the present invention are not attained.

The percent insolubles in boiling xylene (gel percentage) which is determined after extracting the thermoplastic elastomer composition of the present invention thus obtained by crosslinking using the phenolic curing agent, with boiling xylene for 5 hours, is in the range of 3 to 60 wt. %, preferably 10 to 50 wt. %. If the gel percentage is smaller than 3 wt. %, the heat resistance and the oil resistance will become poor, and a gel percentage exceeding 60 wt. % will result in reduced fluidity and elongation.

Before or after crosslinking, or during crosslinking (particularly during melt-kneading), there may be added, if necessary, fillers such as carbon black, clay, talc, calcium carbonate, silica, metallic fibers and carbon fibers, as well as additives such as antioxidant, flame retardant and coloring agent, and paraffinic, naphthenic or aromatic mineral oils for assisting the dispersion of the fillers and enhancing flexibility and elasticity.

Further, various kinds of resins and rubbers may be added, if necessary, in amounts not causing a change in performance of the thermoplastic elastomer composition of the present invention; for example, crystalline polyolefins such as high and low density polyethylenes and linear low density polyethylenes, natural and synthetic rubbers, and styrene-based thermoplastic elastomers.

The thermoplastic elastomer composition of the present invention has the following characteristics.

(a) Superior in fluidity, so easy to mold, giving molded products having good appearance.

(b) Superior in heat and oil resistance.

(c) Small permanent elongation makes deformation difficult.

(d) Superior in flexibility.

(e) Low density and very light weight.

Since the thermoplastic elastomer composition of the present invention has such excellent characteristics, its application range is extremely wide. The following are application examples thereof:

(a) automobile interior sheet, mud guard, lace and cover (b) electric wire coating material (c) components of various electric appliances (d) hose (e) various packing (f) window frame sealing material (g) sound insulating material (h) modifier for various polymers The following examples are given to further illustrate the present invention, but the invention is not limited thereto. In the following working examples and comparative examples, physical properties were measured in the following manner.

[Measurement by DSC]

A hot-pressed 100 $\mu$m thick film as a specimen is heated to 170° C. and held at this temperature for 15 minutes, followed by cooling to 0° C. at a rate of 2.5° C./min. Then, from this state the temperature is raised to 170° C. at a rate of 10° C./min and measurement is made. The vertex position of the maximum peak of peaks appearing during the heat-up period from 0° to 170° C. is regarded as the maximum peak temperature (Tm).

[How to Determine Insolubles in Boiling n-Hexane]

A 200 $\mu$m thick sheet is formed using a hot press from which are then cut out three sheets each 20 mm long by 30 mm wide. Using these sheets, extraction is made in boiling n-hexane for 5 hours by means of a double-tube type Soxhlet extractor. n-Hexane insolubles are taken out and vacuum-dried (50° C., 7 hours), then the percentage insolubles ($C_6$ insoluble) in boiling n-hexane is calculated in accordance with the following equation:

$$\text{Insolubles in boiling n-hexanes (wt. \%)} = \frac{\text{Weight of extracted sheet}}{\text{Weight of unextracted sheet}} \times 100 \text{ (wt. \%)}$$

[Preparing Test Sheet]

Each resin composition obtained is placed in a mold 2 mm thick, 150 mm long and 150 mm wide, preheated at 210° C. for 5 minutes, then pressure-molded for 5 minutes at the same temperature and at 150 kg/cm$^2$, and thereafter cooled for 10 minutes at 30° C. under the pressure of 150 kg/cm$^2$, followed by annealing at 50° C. for 20 hours and allowing to stand at room temperature for 24 hours. Thereafter, physical properties are measured.

[Melt Flow Rate]

JIS K 7210 test condition No. 14 (230° C., 2.16 kgf) is used. Moreover, another condition (230° C. and 21.6 kgf) which is closer to the shear rate in a molding operation is used. The latter reflects fluidity in practical point of view more preferably.

[Tensile Test]

Test piece is prepared using No. 3 dumbbell in accordance with JIS K 6301 and it is measured for tensile strength at a pulling rate of 50 mm/min.

[Permanent Elongation]

Test piece is prepared using No. 3 dumbbell in accordance with JIS K 6301. It is held at 100% elongated state for 10 minutes, then contracted suddenly and allowed to stand for 10 minutes to check a percentage elongation, from which is determined a permanent elongation.

[Vicat Softening Point]

A 3 mm thick specimen is prepared in accordance with the test sheet preparing method and it is used for measurement. A heat transfer medium is heated at a rate of 50° C./min while applying a load of 250 g through a needle-like indenter placed perpendicularly to the specimen in a heating bath, and the temperature of the heat transfer medium at the time when the needle-like indenter permeated 1 mm is regarded as a Vicat softening point.

[Hardness]

Test piece is prepared in accordance with JIS K 6301 and measured for hardness using type A test machine.

[Gel Percentage]

A 200 μm thick sheet is prepared using a hot press (at 200° C. for 5 minutes), from which three 40 mm×20 mm sheets are cut out. The three sheets are each placed in a 120-mesh wire gauze bag and extracted in boiling xylene for 5 hours using a double-tube type Soxhlet extractor. Boiling xylene insolubles are taken out and vacuum-dried (80° C., 7 hours) to determine the boiling xylene insolubles as a gel percentage.

[External Appearance of Extruded Article]

When MFR is measured at 230° C. and at 21.6 kgf, the surface condition of an extruded product is observed visually.

⊚ very good
O: good
Δ: slightly bad
X: bad

Components (A) to (C) used in the following Examples and Comparative Examples are as follows:

[Preparing of Component (A-1)]

An ethylene/butene-1 copolymer (A-1) was prepared by copolymerizing ethylene and butene-1 in the presence of a catalyst comprising a solid catalyst component and triethylaluminum, the solid catalyst component having been obtained from a substantially anhydrous magnesium chloride, 1,2-dichloroethane and titanium tetrachloride. The ethylene/butene-1 copolymer (A-1) thus obtained was found to have an ethylene content of 88.3 mol %, MFR of 0.9 g/10 min, a density of 0.896 g/cm$^3$, Tm of 119.8° C. and a C$_6$ insolubles content of 82 wt. %.

[Preparation of Component (A-2)]

An ethylene/butene-1 copolymer (A-2) was prepared by copolymerizing ethylene and butene-1 in the presence of a catalyst comprising a solid catalyst component and triethylaluminum, the solid catalyst component having been obtained from a substantially anhydrous magnesium chloride, anthracene and titanium tetrachloride.

The ethylene/butene-1 copolymer (A-2) thus obtained was found to have an ethylene content of 85.3 mol %, MFR of 1.0 g/10 min, a density of 0.890 g/cm$^3$, Tm of 121.6° C. and a C$_6$ insolubles content of 58 wt. %.

[Component (B)]

The characteristics of two polypropylenes [Components (B-1) and (B-2)] used are as follows:

| Component | Polymerization | Ethylene Content (Mol %) | MFR g/10 min |
|---|---|---|---|
| (B - 1) | Random copolymerization with ethylene | 5.9 | 7 |
| (B - 2) | Block copolymerization with ethylene | 3.3 | 8 |

[Component (C)]

The characteristics of two ethylene/α-olefin/non-conjugated diene copolymer rubbers [EP 57P and EP 27P (both are products of Japan Synthetic Rubber Co., Ltd. and referred to as (C - 1) and (C - 2), respectively] used are as follows:

| Component | Mooney Viscosity ML$_{1+4}$100° C. | Propylene Content (wt %) | Iodine Value |
|---|---|---|---|
| (C - 1) | 88 | 28 | 15 |
| (C - 2) | 47 | 43 | 15 |
| (C - 3) | 24 | 26 | 0 |

EXAMPLES 1 TO 5

Components (A), (B) and (C) in the proportion, stated in Table 1 were blended and thereafter a predetermined amount of a phenolic curing agent was added and dryblended. Then the resultant mixture was introduced into a Banbury's mixer preheated to 200° C., in which kneading was performed for 20 minutes at 40 rpm to obtain a thermoplastic elastomer composition.

The physical properties thereof were measured and are shown in Table 1.

COMPARATIVE EXAMPLE 1

The procedure of Example 1 was repeated except that the phenolic curing agent was replaced by 0.5 part by weight of di(tertiary-butyl peroxy)diisopropylbenzene.

Physical properties of the resultant composition was measured, the results of which are as shown in Table 2.

COMPARATIVE EXAMPLE 2

The procedure of Example 1 was repeated except that the phenolic curing agent was not added. The results are as shown in Table 2.

COMPARATIVE EXAMPLES 3 AND 4

Components (A), (B) and (C) in the proportions stated in Table 2 were blended and thereafter a predetermined amount of a phenolic curing agent was added and dryblended. Then the resultant mixture was introduced into a Banbury's mixer preheated to 200° C., in which kneading was performed for 20 minutes at 40 rpm to obtain a thermoplastic elastomer composition. The results are as shown in Table 2.

EXAMPLES 6 TO 8 AND COMPARATIVE EXAMPLE 5

Compositions (A), (B) and (C) and a phenolic curing agent in the proportions stated in Tables 1 and 2 were dry-blended and then introduced into a Banbury's mixer preheated to 200° C., in which kneading was performed for 5 minutes at 40 rpm. Then 5 parts by weight of titanium oxide and 1.5 parts by weight of stannous chloride(both are crosslinking accelerators) were added and kneading was performed again for 10 minutes to obtain a thermoplastic elastomer. The results are as shown in Tables 1 and 2.

EXAMPLES 9 AND 10

Compositions (A), (B) and (C) and phenolic curing agent in the proportions stated in Table 1 were blended dryblended. Then the resultant mixture was introduced into a Banbury's mixer preheated to 200° C., in which kneading was performed at 40 rpm for 15 minutes while gradually adding 60 parts by weight of a processing oil ("KOMOREX 300", a product of Nippon Oil Co., Ltd.) to obtain a thermoplastic elastomer composition. The results are as shown in Table 1.

TABLE 1

| Example | Composition Component | Blending Ratio parts by weight | Curing Agent | Parts by wt. | Melt Flow Rate 230° C., 2.16 kgf (g/10 min) | Melt Flow Rate 230° C., 21.6 kgf (g/10 min) | Tensile Strength (kg/cm$^2$) |
|---|---|---|---|---|---|---|---|
| 1 | A-1/B-1/C-1 | 50/50/100 | t-butyl MP* tetramer | 5 | 0.01 | 156 | 95 |
| 2 | " | 35/65/100 | t-butyl MP* tetramer | 5 | 0.03 | 190 | 98 |
| 3 | " | 65/35/100 | t-butyl MP* tetramer | 5 | 0.01 | 135 | 115 |
| 4 | A-2/B-2/C-1 | 50/50/120 | t-butyl MP* tetramer | 3 | 0 | 103 | 110 |
| 5 | A-1/B-1/C-2 | 50/50/80 | α,α,γ-tetramethylbutyl MP dimer-tetramer | 3 | 0.01 | 175 | 120 |
| 6 | A-2/B-2/C-1 | 60/40/120 | t-butyl MP tetramer + crosslinking accelerator | 3 + 6.5 | 0 | 98 | 111 |
| 7 | " | 40/60/120 | t-butyl MP tetramer + crosslinking accelerator | 3 + 6.5 | 0 | 103 | 136 |
| 8 | A-1/B-1/C-1 | 50/50/100 | t-butyl MP tetramer + crosslinking accelerator | 1 + 6.5 | 0.01 | 103 | 136 |
| 9 | A-1/B-1/C-2 | 35/65/80 | α,α,γ,γ-tetramethylbutyl MP dimer-tetramer | 3 | 0.02 | 205 | 102 |
| 10 | " | 65/35/80 | α,α,γ,γ-tetramethylbutyl MP dimer-tetramer | 3 | 0.02 | 205 | 102 |

| Example | Tensile Elongation (%) | Permanent Elongation (%) | Vicat Softening Point (°C.) | Hardness JIS A/C | Gel Percentage (%) | Appearance of Extruded Product (with the eye) |
|---|---|---|---|---|---|---|
| 1 | 300 | 9 | 117.1 | 72 | 34.1 | |
| 2 | 330 | 12 | 119.5 | 76 | 32.5 | |
| 3 | 380 | 10 | 120.3 | 72 | 34.4 | |
| 4 | 400 | 9 | 95.8 | 67 | 40.5 | |
| 5 | 310 | 10 | 120.5 | 73 | 25.6 | |
| 6 | 420 | 8 | 96.2 | 63 | 38.3 | |
| 7 | 480 | 9 | 102.2 | 65 | 35.6 | |
| 8 | 440 | 12 | 105.2 | 76 | 30.4 | |
| 9 | 440 | 11 | 123.3 | 75 | 20.3 | |
| 10 | 450 | 10 | 103.9 | 70 | 22.5 | |

*MP means methyl phenol and then 20 parts by weight of clay was added and

TABLE 2

| Comparative Example | Composition Component | Blending Ratio parts by wt. | Curing Agent | Parts by wt. | Melt Flow Rate 230° C., 2.16 kgf (g/10 min) | Melt Flow Rate 230° C., 21.6 kgf (g/10 min) | Tensile Strength (kg/cm$^2$) |
|---|---|---|---|---|---|---|---|
| 1 | A-1/B-1/C-1 | 50/50/100 | di(t-butylperoxy) | 0.5 | 0.10 | 88 | 132 |
| 2 | " | 50/50/100 | — | — | 10 | >300 | 38 |
| 3 | " | 50/50/40 | t-butyl MP*tetramer | 5 | 0.02 | 215 | 183 |
| 4 | A-1/B-1/C-3 | 50/50/100 | t-butyl MP*tetramer | 5 | 3.5 | >300 | 45 |
| 5 | A-1/B-1/C-1 | 30/70/200 | t-butyl MP*tetramer | 3 | 0 | 16 | 75 |

| Comparative Example | Tensile Elongation (%) | Permanant Elongation (%) | Vicat Softening Point (°C.) | Hardness JIS A/C | Gel Percentage (%) | Appearance of Extruded Product (with the eye) |
|---|---|---|---|---|---|---|
| 1 | 560 | 18 | 116.0 | 88 | 39.0 | Δ |
| 2 | 830 | 35 | 41.3 | 62 | 0 | |
| 3 | 580 | 23 | 119.4 | 95 | 15.4 | |
| 4 | 710 | 25 | 55.0 | 60 | 2.5 | |

TABLE 2-continued

| | | | | | | |
|---|---|---|---|---|---|---|
| 5 | 260 | 7 | 66.8 | 53 | 55.6 | X |

*MP means methyl phenol

What is claimed is:

1. A thermoplastic elastomer composition prepared by crosslinking a composition comprising the following components (A), (B) and (C) by using a phenolic curing agent:
   (A) 30-70 parts by weight of an ethylene/α-olefin copolymer prepared by copolymerizing ethylene and an α-olefin having 3 to 12 carbon atoms in the presence of a catalyst comprising a solid component and an organoaluminum compound which solid component contains at least magnesium and titanium, said ethylene/α-olefin copolymer having the following properties (I) to (IV):

| (I) Melt index | 0.01-100 g/10 min |
   |---|---|
   | (II) Density | 0.870-0.905 g/cm$^3$ |
   | (III) Maximum peak temperature as measured according to a differential scanning calorimetry (DSC) | not lower than 100° C. |
   | (IV) Insolubles in boiling n-hexane | not less than 10 wt. % |

(B) 70-30 parts by weight of a propylene polymer; and
   (C) 70-150 parts by weight, based on 100 parts by weight of the component (A) and (B), of an ethylene/α-olefin/non-conjugated diene copolymer rubber.

2. A composition as set forth in claim 1, wherein when the crosslinking is performed a metal compound type crosslinking accelerator is used together with the phenolic curing agent.

3. A composition as set forth in claim 1, wherein the α-olefin content of the ethylene/α-olefin copolymer (A) is in the range of 5 to 40 mol %.

4. A composition as set forth in claim 1, wherein the α-olefin of the ethylene/α-olefin copolymer (A) is propylene, butene-1, 4-methylpentene-1, hexene-1, octene-1, decene-1, or dodecene-1.

5. A composition as set forth in claim 1, wherein the propylene polymer (B) is a homopolymer of propylene or a copolymer of propylene and an α-olefin having 2 to 8 carbon atoms.

6. A composition as set forth in claim 1, wherein the non-conjugated of the ethylene/α-olefin/non-conjugated diene copolymer rubber is 1,4-hexadiene or ethylidene norbornene.

7. A composition as set forth in claim 1, wherein the ethylene/αolefin/non-conjugated diene copolymer rubber (C) has Mooney viscosity (ML$_{1+4}$, 100° C.) in the range of 10 to 95.

8. A composition as set forth in claim 1, wherein the phenolic curing agent is an alkyl methylol phenol oligomer.

* * * * *